United States Patent [19]
Karbowski

[11] Patent Number: 4,959,157
[45] Date of Patent: Sep. 25, 1990

[54] WASTEWATER DISINFECTION WITH A COMBINATION OF BIOCIDES

[75] Inventor: Robert J. Karbowski, Sanford, Mich.

[73] Assignee: The Dow Chemical Company, Midland, Mich.

[21] Appl. No.: 272,854

[22] Filed: Nov. 18, 1988

[51] Int. Cl.$^5$ ................................................. C02F 1/50
[52] U.S. Cl. .................................... 210/752; 210/755; 210/764
[58] Field of Search ............... 210/752, 754, 755, 764, 210/765; 162/161; 71/67

[56] References Cited

U.S. PATENT DOCUMENTS

| | | | |
|---|---|---|---|
| 3,493,658 | 2/1970 | Schmidt et al. | 424/267 |
| 4,732,913 | 3/1988 | Donofrio et al. | 210/764 X |
| 4,800,082 | 1/1989 | Karbowski et al. | 210/754 X |

OTHER PUBLICATIONS

Karbowski et al., "DNPA: An Alternative for Reducing Chlorine Residuals in Municipal Wastewater Treatment Plants", presented at the annual conference of the Water Pollution Control Federation, Dallas, Texas, Oct. 5, 1988.

Walter, Jr. et al., "Compatiability of DBNPA with Chlorine as Water Treatment Biocides", presented at the 46th Annual Meeting of the International Water Conference, Pittsburgh, Pa., Nov. 4–7, 1985.

Primary Examiner—Tom Wyse

[57] ABSTRACT

Wastewater is effectively disinfected while reducing both chlorine consumption and more particularly the levels of residual chlorine discharged from the wastewater treatment plant. The wastewater is first contacted with a sufficient amount of chlorine to satisfy the chlorine demand and to obtain as low a residual level of chlorine as possible. After the chlorine demand has been satisfied, the wastewater is disinfected with an effective amount of 2,2-dibromo-3-nitrilopropionamide.

4 Claims, 4 Drawing Sheets

EFFECT OF CO-TREATMENT WITH CHLORINE AND DBNPA ON FECAL COLIFORM COUNTS

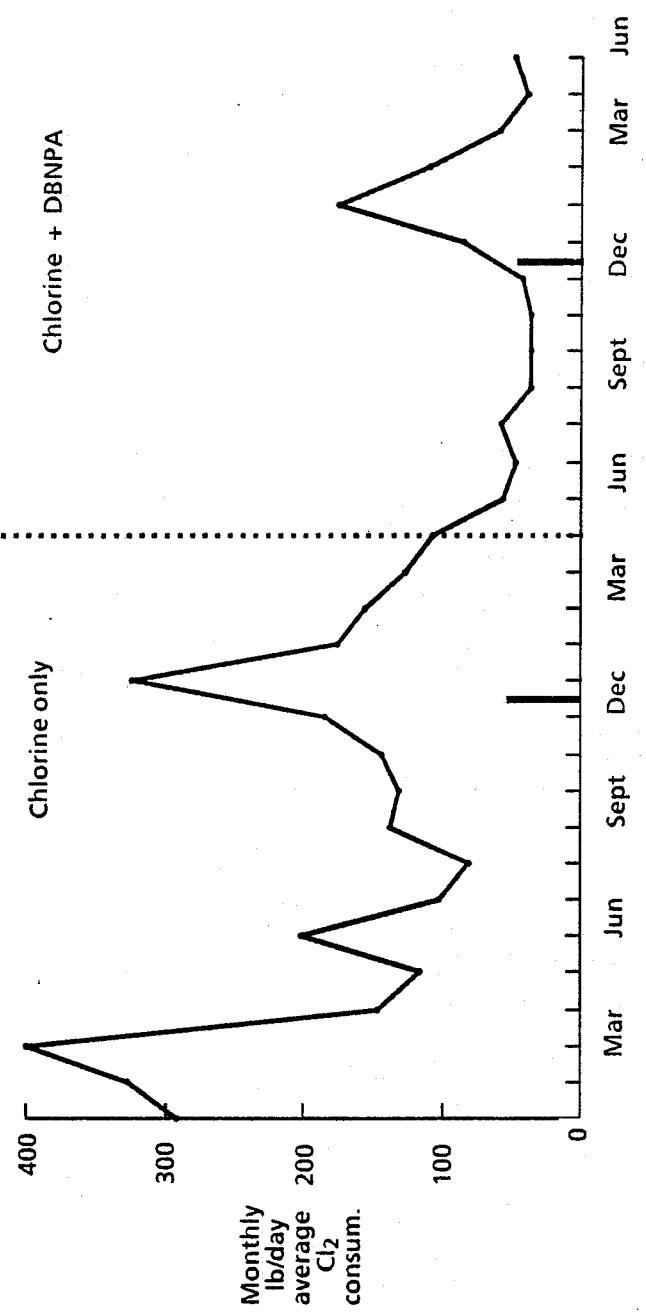

WASTEWATER DISINFECTION WITH A COMBINATION OF BIOCIDES

FIELD OF INVENTION

The present invention is directed to the disinfection of the effluent from wastewater treatment plants with a biocidal combination of an α-halogenated amide and chlorine.

BACKGROUND OF THE INVENTION

The term "disinfection", as applied to municipal wastewater, refers to a reduction in the population of pathogenic organisms (generally bacteria species). Since several different bacteria species are known to be present in wastewater, an indicator organism (such as the bacterium Escherichia coli which is known to exist in human fecal matter) for which specific monitoring methods are available is used to monitor disinfection. The effluent from a wastewater treatment plant (WWTP) is considered to be "disinfected" if the number of indicator organisms per volume of effluent falls at or below a preset guideline. These guidelines are typically included as one of a set of effluent limitations in a National Pollution Discharge Elimination System (NPDES) Permit specific to a single WWTP. Permits are issued at the State level by a regulatory body within the State, with the Environmental Protection Agency having oversight authority. A typical NPDES Permit may mandate daily testing for fecal coliform bacteria and may stipulate limits such as "less than 200 per 100 mL effluent" for the geometric mean of 30 days of tests and such as "less than 400 per 100 mL effluent" for the geometric mean of 7 days of such tests. Since the early part of the twentieth century chlorine has been commonly used to disinfect wastewater. Although several chlorine-releasing chemicals may be used to accomplish this, a more typical method is for chlorine gas to be added to the wastewater directly. This is usually one of the last or the last treatment in a municipal WWTP.

Chlorine must be added in an amount sufficient to satisfy the "chlorine demand" of the water being treated. When chlorine is added to wastewater at low concentrations, a fast reaction occurs with various organic species, including naturally occurring chemicals such as fulvic and humic acids. The initial amount of chlorine which reacts in this fashion is said to be satisfying the chlorine demand. The demand of different waters will vary depending on the amount(s) of organic species present. Once the demand is satisfied, addition of more chlorine will result in a chlorine residual which is detectable by various analytical means. It is the residual chlorine which is available as an oxidizing biocide to disinfect the water. The level of chlorine residual required to disinfect WWTP effluent varies from one plant to another and within the same plant due to variations in the specific wastewater being treated. Some plants may be able to disinfect with a chlorine residual of 0.1 parts per million (ppm) whereas others may require greater than 2.0 ppm. Typical levels of chlorine residual required for disinfection would be in the range from 0.3 to 1.0 ppm.

Chlorine residual limits are generally included in NPDES Permits. Until recently, chlorine residual limits have been relatively high and plants have generally not had problems maintaining disinfection. In 1984, the EPA established a National Municipal Policy which required WWTP's to comply with provisions of the Clean Water Act. Under the Clean Water Act, the States have the responsibility to regulate chemicals which are discharged from WWTP's. One chemical which is under scrutiny at the present time is chlorine. Specific concerns about chlorine stem from fish toxicity, fish avoidance of the zone in which chlorine is discharged, formation of chloramines (reaction products of chlorine and ammonia which are also toxic to fish and which persist longer than chlorine), and formation of halogenated methanes as a result of chlorine addition. As a result of these concerns, several States have proposed that the level of residual chlorine in WWTP effluents be considerably lower. In Michigan, for example, the level which was traditionally acceptable was 1.0 ppm. It is now proposed that the acceptable limit be reduced to 0.036 ppm. Most, if not all, WWTP's would not be able to meet the requirements for disinfection (which are not expected to change) with chlorine residuals below 0.036 ppm.

In an attempt to reduce the level of chlorine in the effluent, some WWTP's are adding sulfur dioxide feed systems. Sulfur dioxide, when added to the effluent, will react with the residual chlorine rapidly and cause the measurable residual to diminish to non-detectable. There are numerous disadvantages to this technique, including the capital cost of installing the feed system, the on-going chemical cost, the operating and maintenance expense, the possible effects on the chemistry of the effluent, the reporting requirements for leaks, and the relative lack of data on the environmental impact of sulfur dioxide.

Ultraviolet disinfection and ozonation as a means of disinfection have both been proposed. While both are theoretically possible, neither has proven to be reliable in WWTP's. Moreover, the cost of either technique is very high, involving both high capital expenses and high operating and maintenance costs.

Polishing ponds have also been proposed as a means to meet new requirements. These are merely holding basins in which wastewater effluent is exposed to the environment for some time period after disinfection and the residual chlorine is allowed to dissipate naturally. Use of this technology requires considerable space, which could necessitate the purchase of land. In addition, installation of the polishing pond for even a small WWTP is costly. This method will also result in the re-growth of bacteria prior to discharge of the effluent.

An economical method which would allow WWTP's to lower the addition of chlorine to a point where chlorine residual would be acceptable from an environmental point of view while simultaneously maintaining the levels of disinfection required in their operating permits is highly desirable.

SUMMARY OF THE INVENTION

The present invention is directed to a method for disinfecting wastewater which comprises contacting the wastewater to be disinfected with an effective amount of a mixture of chlorine and 2,2-dibromo-3-nitrilopropionamide (DBNPA).

DBNPA is an effective biocide which rapidly degrades to carbon dioxide, bromide ion and ammonia. Because of the rapid degradation of DBNPA, it is a more environmentally acceptable material than chlorine.

The use of chlorine and DBNPA for wastewater disinfection allows for a substantial reduction in chlorine usage with a concomitant reduction in residual chlorine levels while maintaining prescribed levels of disinfection. This is accomplished with a minimum of capital and operating expenses.

BRIEF DESCRIPTION OF THE FIGURES

FIG. 4 is a graph depicting average daily chlorine consumption at the West Bay County, Michigan wastewater treatment plant both before and after using DBNPA.

DETAILED DESCRIPTION OF THE INVENTION

Figure 1:
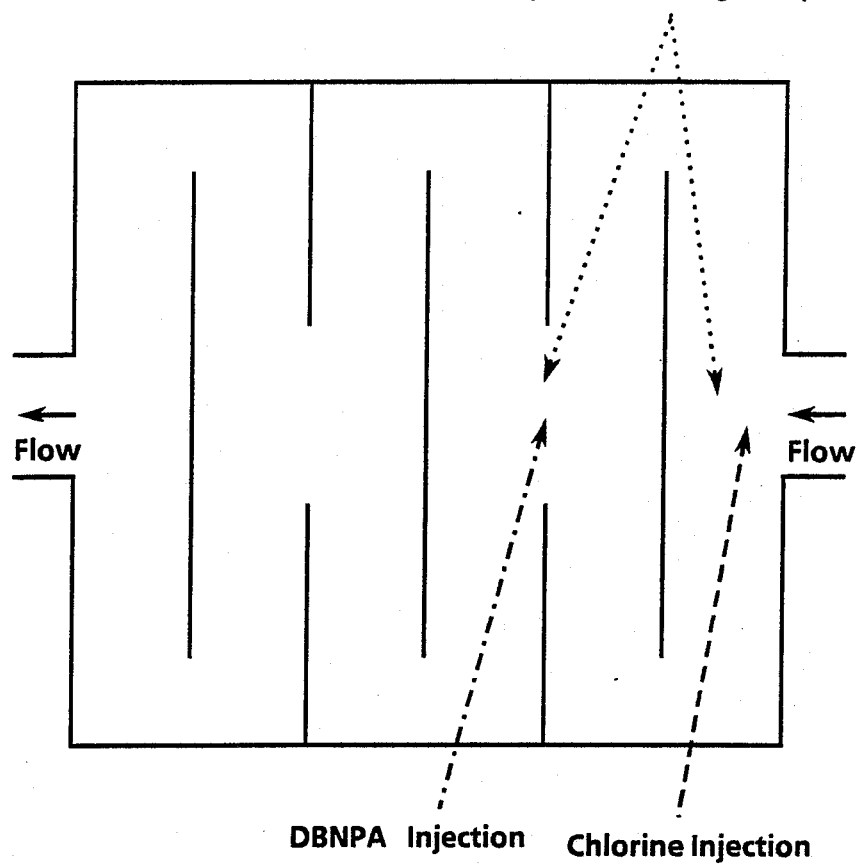
FIG. 1 schematically illustrates a typical holding chamber used for the disinfection of wastewater in WWTP's.

In the practice of the present invention, chlorine is added to the wastewater at the entrance of a chamber that will provide contact time as illustrated in FIG. 1. The level of chlorine is typically adjusted to obtain a residual level at the end of the contact time as low as possible, i.e., as low as can be routinely measured. The residual must be greater than zero in order to satisfy the "chlorine demand." Continuous on-line monitoring of chlorine residual is preferred over periodic sampling.

Best results are obtained when the chlorine is rapidly distributed in the wastewater. Adequate mixing can be provided by conventional equipment such as pumps.

The DBNPA is added as soon as possible and at a point after the "chlorine demand" has been satisfied. Again, rapid mixing is preferred. A mixing pump, for example, can be placed adjacent to the DBNPA feed point. If "chlorine demand" is not satisfied prior to addition of DBNPA, then breakdown of DBNPA will be hastened and additional product will be required to accomplish disinfection.

The mechanism for feeding chlorine into a wastewater treatment system is well-known in the industry. Feed of the DBNPA can be accomplished via a suitable pump, e.g., a chemical metering pump and tubing constructed of materials inert to DBNPA.

In WWTP's where the flow is not constant, it is preferred that the feed rates of both chlorine and DBNPA be flow-proportioned. Chlorine flow should be monitored and adjusted as necessary to maintain a barely detectable residual.

The method of the present invention is effective under most climatic and operational conditions typically encountered. For example, the present invention is effective at temperatures ranging from about $-20°$ F. to about $105°$ F. and at all pH levels usually experienced in WWTP's.

Effective concentrations of DBNPA range from about 0.07 to about 0.5 mg/L of effluent when used in conjunction with residual chlorine. Preferably, from about 0.10 to about 0.20 mg/L of DBNPA are employed with residual levels of chlorine ranging from about 0.05 to about 0.005 mg/L. High levels of biological oxygen demand (BOD) or suspended solids may require higher levels of DBNPA.

The following examples illustrate the present invention but are not to be construed as limiting the same.

EXAMPLE 1

Wastewater disinfection with mixtures of DBNPA and chlorine

The West Bay County, Michigan Plant is a 4 million gallon per day (mgd) facility serving the communities surrounding Bay City. The influent is predominantly domestic waste, with a potato chip manufacturer being the largest year-around source of industrial waste. During the winter months, a beet sugar mill provides most of the industrial waste. The plant uses primary and secondary treatment followed by disinfection. Disinfection had previously been done with chlorine alone and required a residual of 0.6 mg/L to control fecal coliforms adequately. The chlorine contact chamber provides about 20 minutes of contact time, although channeling allows some breakthrough in 10 minutes. Disinfection is required all year due to proximity of the discharge to the drinking water source for the County. The disinfection criteria are a geometric mean fecal coliform count of less than 200 per 100 mL over a 30-day period and less than 400 per 100 mL over a 7-day period. Fecal coliform counts were determined by conventional procedures.

To determine the effectiveness of the DBNPA plus chlorine combination, initial rangefinding studies were conducted on one side of the two-sided contact chamber. The total residual chlorine (as determined by amperometric titration of grab samples) was lowered over a four hour period by reducing the feed rate. A tote containing 300 gallons of 20% DBNPA was placed adjacent to the contact chamber. Feed was accomplished by placing an adjustable rate chemical metering pump connected by flexible tubing to the tote. PVC tubing was used to connect a line from the pump exit to a point in the contact chamber immediately after the chlorine diffusers. To ensure rapid mixing, a one-half horsepower submersible pump was suspended in the chamber adjacent to the exit of the DBNPA feed. The pump was calibrated to deliver 0.2 mg/L DBNPA at the nominal flow of 2 mgd through this side of the contact chamber. Each week the feed rate was lowered by approximately 10% until the delivery was 0.1 mg/L. Due to variations in the actual flow through the plant the DBNPA feed varied from 0.07 mg/L to 0.27 mg/L throughout the test period. The chlorine residual varied similarly and during this study was adjusted manually to maintain a residual as low as possible but above zero. At least twice daily grab samples were taken at the end of the chamber for determination of total residual chlorine and fecal coliform counts. About 1 month into the study, all of the plant effluent was directed to the side of the contact chamber using DBNPA and chlorine, effectively doubling the flow and cutting the contact time in half. In general, this resulted in an overall improvement in disinfection. This most likely was due to increased initial mixing of the chlorinated effluent with DBNPA.

In addition, during the first two months a liquid chromatograph was set up and used to monitor for DBNPA in the effluent. Samples were taken either 2 or 4 times daily (at all times of the day and night). The detection limit of the method varied from 0.1 to about 0.2 mg/L depending on effluent quality. At no time during the study was DBNPA detectable in the effluent.

Data was collected for 5 months at DBNPA concentrations ranging from 0.07 to 2.7 mg/L. It was concluded that under routine operating conditions, 0.10 mg/L was sufficient to achieve disinfection when using chlorine at a residual of 0.036 mg/L. Table I lists the approximate combinations of DBNPA and chlorine which were required. Exceptions were noted during the study, but they were generally able to be traced to a particular cause (e.g., rapid unexpected change in influent BOD, faulty chlorine feed, etc.)

TABLE I

DBNPA/CHLORINE COMBINATIONS
WHICH PROVIDED GOOD DISINFECTION

| mg/L DBNPA | mg/L Chlorine Residual |
| --- | --- |
| 0.07–0.09 | 0.06–0.10 |
| 0.10–0.11 | 0.02–0.05 |
| 0.12–0.15 | 0.01–0.02 |
| 0.16–0.20 | 0.005–0.01 |

Figure 2:
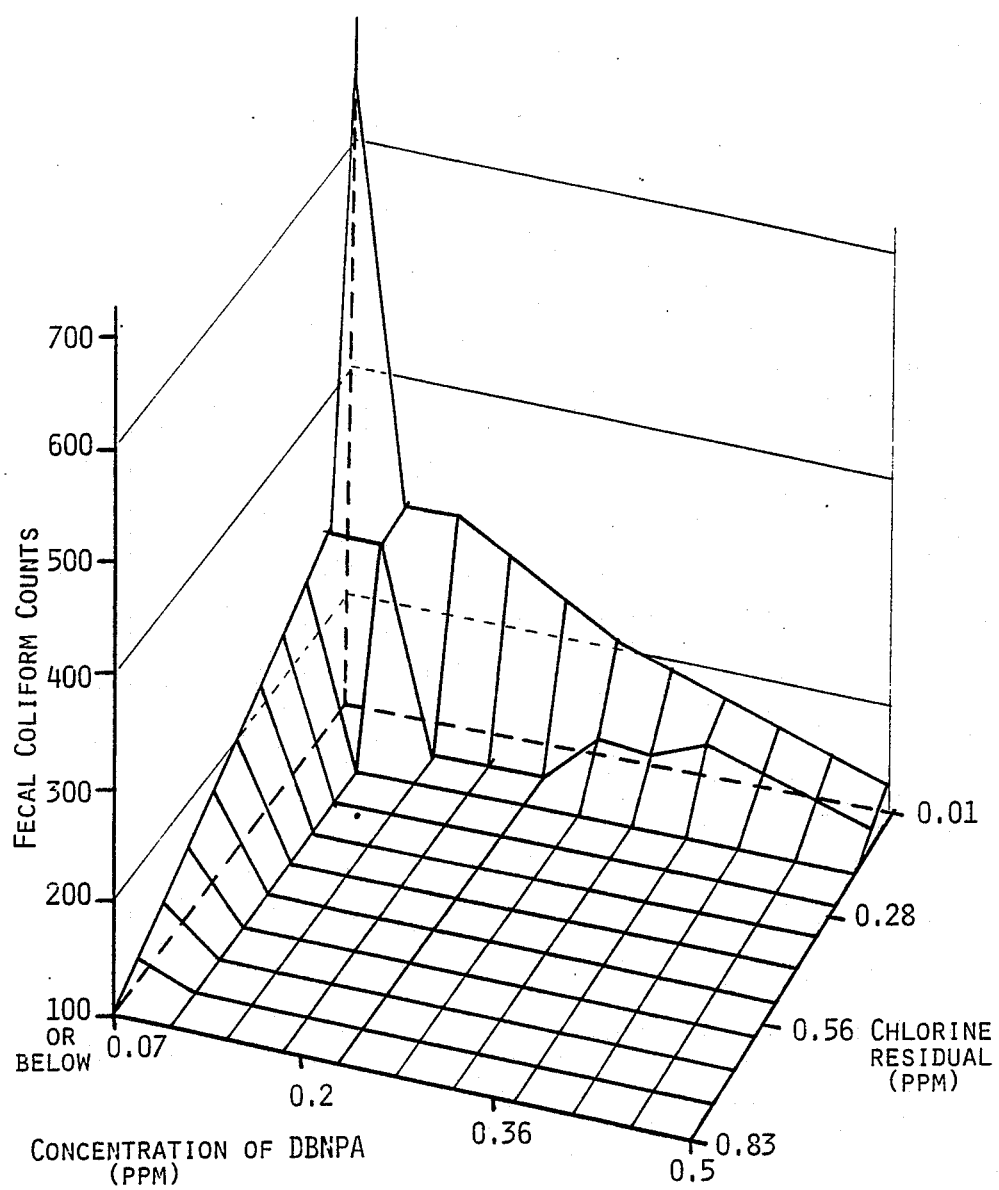
FIG. 2 is a 3-dimensional graph illustrating the disinfection of effluent from a WWTP by combinations of DBNPA and chlorine.

FIG. 2 is a 3-dimensional graphic presentation of the data collected during the 5 month test period. The graph illustrates effluent disinfection in terms of fecal coliform counts per 100 mL of effluent provided by mixtures of DBNPA and chlorine at various concentrations. Fecal coliform counts below 200 counts per 100 mL are considered effective levels of disinfection. Representative examples of the raw data used to compile FIG. 2 are presented in Table II.

TABLE II

FECAL COLIFORM COUNTS
PER 100 ML OF EFFLUENT VERSUS
DBNPA/CHLORINE COMBINATIONS

| mg/L DBNPA | mg/L Chlorine Residual | Fecal Coliforms/100 mL |
| --- | --- | --- |
| 0.09 | 0.10 | 62 |
| 0.09 | 0.09 | 28 |
| 0.14 | 0.08 | 100 |
| 0.15 | 0.07 | 40 |
| 0.16 | 0.06 | 40 |
| 0.11 | 0.05 | 60 |
| 0.10 | 0.04 | 140 |
| 0.10 | 0.025 | 40 |
| 0.17 | 0.010 | 88 |

After the range-finding study, the facility began continuous application of 0.10 mg/L DBNPA. Feed rates of both DBNPA and chlorine were flow-controlled by coupling to a 4 to 20 milliamp signal generated at the Parshall Flume. A Parshall Flume is a flow-measuring apparatus consisting essentially of a trough through which the water flows, having a geometric shape which results in the depth of the water being proportional to the water flowing through it. The 300 gallon tote of formulated DBNPA was placed permanently mounted on the chamber sidewall. The only deviation of the DBNPA feed level occurred during the peak of the annular sugar campaign, at which time the concentration of DBNPA was raised to 0.11–0.12 mg/L.

Figure 3:
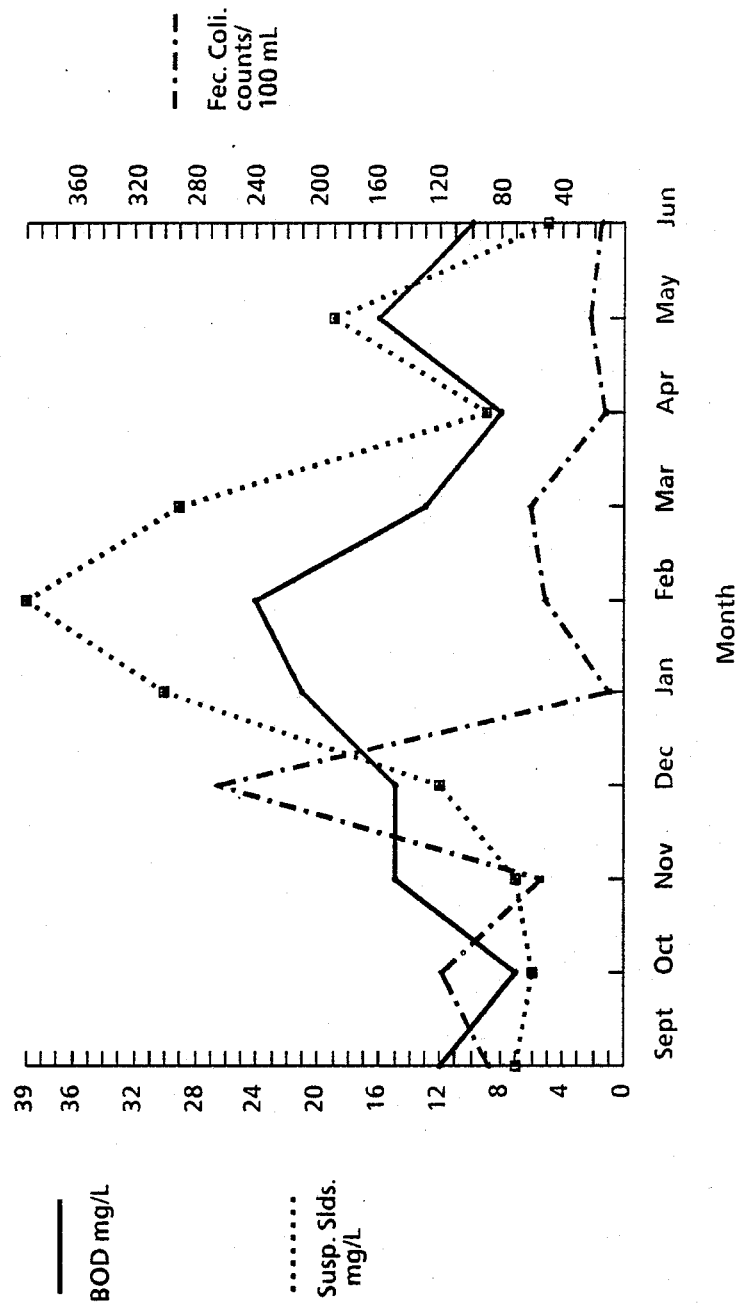
FIG. 3 is a graph illustrating the monthly data from the West Bay County, Michigan wastewater treatment plant over a nine-month period with respect to fecal coliform counts, biological oxygen demand (BOD) and suspended solids while using 0.1 mg/L of DBNPA with residual chlorine.

A summary of the monthly data submitted by the plant for coliform counts, BOD, and suspended solids is summarized in Table III and shown in FIG. 3. During this period the WWTP was disinfecting continuously with 0.1 mg/L DBNPA and low chlorine. Two points are not in compliance with the NPDES permit, the coliform count in December and the suspended solid level in February (permit allows up to 30 mg/L). In both cases the non-compliance was the result of upsets due to the beginning of the sugar campaign. With the exception of December disinfection has been acceptable. This is true in spite of normal upsets in plant operation (e.g., clarifier cleaning, raw sewage pumps running, etc.). It must be noted that in spite of flow-proportioning chlorine the residual on several occasions would exceed the targeted maximum of 0.036 mg/L. The data showed, however, that the coliform counts were essentially the same if times of higher results were excluded.

TABLE III

MONTHLY DATA WHILE USING 0.1 MG/L
DBNPA AND CHLORINE

| Month | Fecal Coliforms/100 mL | BOD (mg/L) | Susp. Solids (mg/L) |
| --- | --- | --- | --- |
| Sept. '87 | 88 | 12 | 7 |
| Oct. | 119 | 7 | 6 |
| Nov. | 54 | 15 | 7 |
| Dec. | 265 | 15 | 12 |
| Jan. '88 | 9 | 21 | 30 |
| Feb. | 51 | 24 | 39 |
| Mar. | 61 | 13 | 29 |
| Apr. | 12 | 8 | 9 |
| May | 22 | 16 | 19 |
| Jun. | 15 | 10 | 5 |

Chlorine usage at this WWTP has decreased dramatically since the DBNPA plus chlorine combination has been implemented. FIG. 4 shows average daily chlorine consumption on a monthly basis. In the months prior to using DBNPA, average chlorine feed per day was 84 kg (185 pounds). Since starting to add DBNPA continuously at 0.1 mg/L, average chlorine feed per day has been less than 30 kg (65 pounds).

What is claimed is:

1. A process for disinfecting wastewater which comprises:
   (a) contacting the wastewater with a sufficient amount of chlorine to satisfy the chlorine demand and to provide a residual level of chlorine of from about 0.005 to about 0.05 mg/L and
   (b) contacting the chlorine-treated wastewater with an effective amount of 2,2-dibromo-3-nitrilopropionamide to disinfect the wastewater.

2. The process of claim 1 in which the chlorine-treated wastewater is treated with the 2,2-dibromo-3-nitrilopropionamide at a point as soon as possible after the chlorine demand has been satisfied.

3. The process of claim 2 in which the effective concentration of 2,2-dibromo-3-nitrilopropionamide range from about 0.07 to about 0.5 mg/L.

4. The process of claim 3 in which the feed rates of both chlorine and 2,2-dibromo-3-nitrilopropionamide are flow-proportioned with the flow rate of the wastewater.

* * * * *

UNITED STATES PATENT AND TRADEMARK OFFICE
CERTIFICATE OF CORRECTION

PATENT NO. : 4,959,157
DATED : September 25, 1990
INVENTOR(S) : Robert J. Karbowski It is certified that error appears in the above-identified patent and that said Letters Patent is hereby corrected as shown below:

On the title page, Field [56], References Cited, OTHER PUBLICATIONS: "Compatiability" should read --Compatability--.

Column 1, line 57, "treated Some" should read --treated. Some--.

Column 5, line 54, "permanently mounted" should read --permanently next to the contact chamber and the pump permanently mounted--.

Signed and Sealed this

Fifth Day of May, 1992

Attest:

DOUGLAS B. COMER

*Attesting Officer*   *Acting Commissioner of Patents and Trademarks*